US010836038B2

(12) United States Patent
Sun et al.

(10) Patent No.: US 10,836,038 B2
(45) Date of Patent: Nov. 17, 2020

(54) LEARNING PATH CONTROL

(71) Applicant: Fanuc America Corporation, Rochester Hills, MI (US)

(72) Inventors: Yi Sun, West Bloomfield, MI (US); Jason Tsai, Bloomfield Hills, MI (US); Laxmi Musunur, Rochester Hills, MI (US); Michael Sharpe, Orion, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 1625 days.

(21) Appl. No.: 14/283,749

(22) Filed: May 21, 2014

(65) Prior Publication Data

US 2015/0336267 A1   Nov. 26, 2015

(51) Int. Cl.
*B25J 9/16* (2006.01)
*G05B 19/404* (2006.01)
*G05B 19/04* (2006.01)

(52) U.S. Cl.
CPC .......... *B25J 9/163* (2013.01); *G05B 19/0405* (2013.01); *G05B 19/404* (2013.01); *G05B 2219/37092* (2013.01); *G05B 2219/49166* (2013.01); *Y10S 901/41* (2013.01)

(58) Field of Classification Search
CPC ..... Y10S 901/03; Y10S 901/41; G05B 19/19; G05B 2219/40562; G05B 19/404; G05B 19/0405; G05B 2219/37092; G05B 2219/49166; B25J 9/163
USPC ............... 700/88, 161, 249, 258; 901/3, 4, 9
See application file for complete search history.

(56) References Cited

U.S. PATENT DOCUMENTS

| 4,772,831 | A | * | 9/1988 | Casler, Jr. | ............ G05B 19/416 318/567 |
| 4,813,233 | A | | 5/1989 | Gordon | |
| 4,912,753 | A | | 3/1990 | Evans, Jr. | |
| 5,521,829 | A | * | 5/1996 | Jeon | ................... G05B 19/4068 700/161 |
| 6,134,486 | A | | 10/2000 | Kanayama | |
| 6,198,976 | B1 | | 3/2001 | Sundar et al. | |
| 6,266,570 | B1 | | 7/2001 | Hocher et al. | |

(Continued)

FOREIGN PATENT DOCUMENTS

JP   2003-191186 A   7/2003
JP   2009-020846 A   1/2009

*Primary Examiner* — James J Lee
*Assistant Examiner* — Shon G Foley
(74) *Attorney, Agent, or Firm* — Shumaker, Loop & Kendrick, LLP; John A. Miller

(57) ABSTRACT

A robot is moved along a first continuous programmed path with a robot controller executing a learning path control program without performing an operation on a workpiece. The actual movement of the robot along the first continuous programmed path is recorded. The first continuous programmed path is adjusted to create a second programmed path. The robot is moved along the second continuous programmed with the robot controller executing the learning path control program without performing the operation on the workpiece. The actual movement of the robot along the second continuous programmed path is recorded. Traces of the recorded actual movements of the robot along the first continuous programmed path and the second continuous programmed path are displayed.

18 Claims, 5 Drawing Sheets

(56) References Cited

U.S. PATENT DOCUMENTS

| | | | |
|---|---|---|---|
| 7,130,718 B2 * | 10/2006 | Gunnarsson | B25J 9/1638 |
| | | | 219/124.1 |
| 7,149,602 B2 | 12/2006 | Watanabe et al. | |
| 7,251,548 B2 | 7/2007 | Herz et al. | |
| 7,272,524 B2 | 9/2007 | Brogardh | |
| 7,853,356 B2 | 12/2010 | Tsai et al. | |
| 8,271,131 B2 | 9/2012 | Kato et al. | |
| 2006/0025890 A1 | 2/2006 | Nagatsuka et al. | |
| 2010/0241289 A1 * | 9/2010 | Sandberg | B25J 9/1689 |
| | | | 701/2 |
| 2011/0087371 A1 | 4/2011 | Sandberg et al. | |
| 2013/0123982 A1 | 5/2013 | Chiu et al. | |
| 2013/0345718 A1 | 12/2013 | Crawford et al. | |

\* cited by examiner

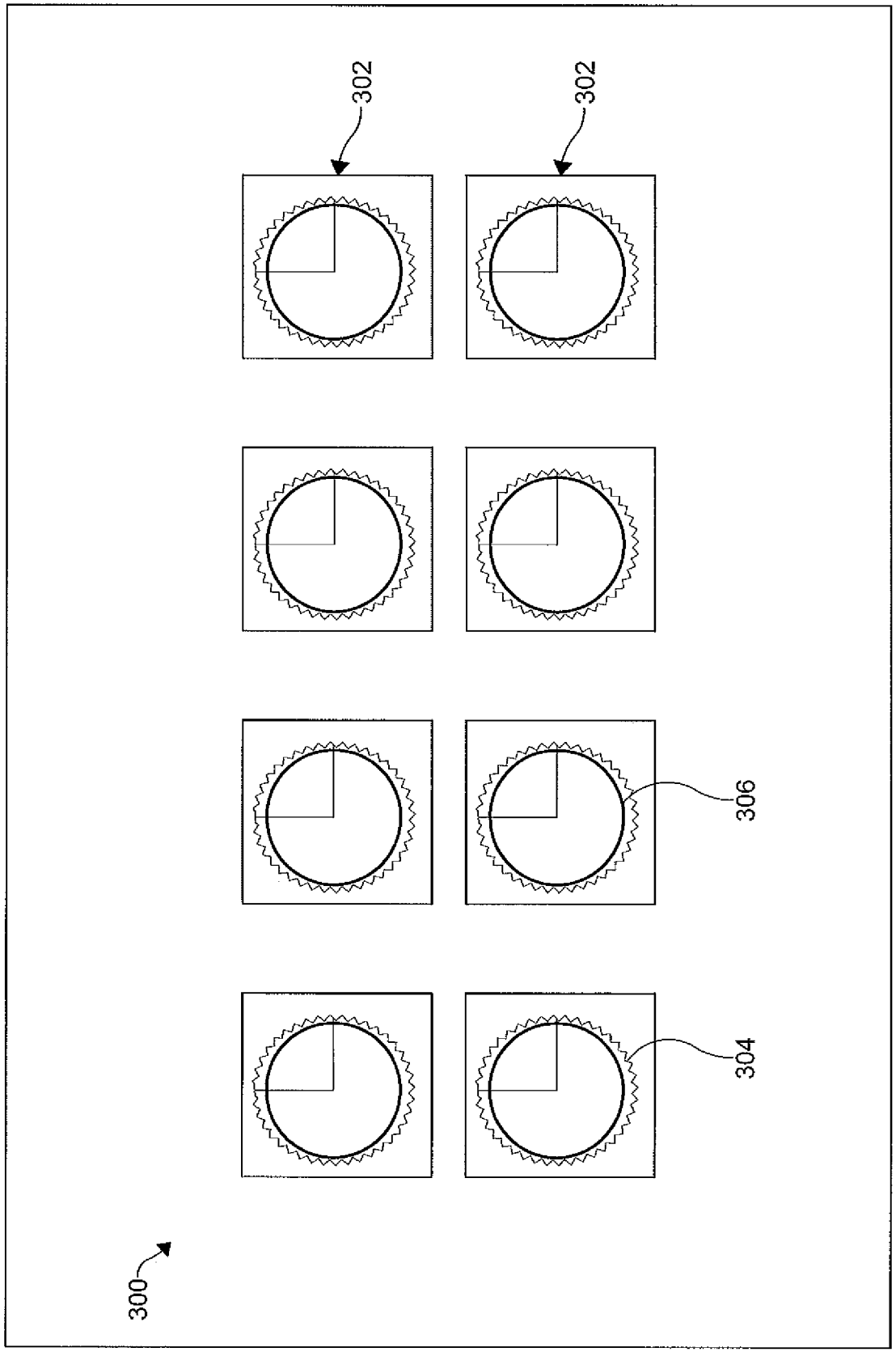

LEARNING PATH CONTROL

FIELD OF THE INVENTION

The present invention relates generally to robotic systems, and more particularly, to systems and methods for robotic cutting tool operations.

BACKGROUND OF THE INVENTION

Programmable controllers operate elaborate industrial equipment, such as robots, in accordance with a plurality of stored control programs. When executed, each program causes the programmable controller or robot controller to examine the state of the controlled machinery by evaluating signals from one or more sensing devices (e.g., position encoders, temperature sensors, or pressure sensors) and to operate the machinery (e.g., by controlling the output voltage for servo motors, or energizing/de-energizing discrete components) based on a procedural framework, the sensor signals and, if necessary, more complex processing.

The programmable controller is generally described as a computer-based control unit that is represented by an aggregate of conventional elements. The control unit also supports one or more user interfaces to facilitate operator input of processing programs, commanded positions, and system parameters. Such user interfaces may include teach pendants (TP) that allow a programmer to lead a robot through a desired sequence of events by activating the appropriate pendant button or switch, and may include offline PC simulation devices on which a required sequence of functional and positional steps may be written for simulated execution or for actual test execution in combination with a teach pendant.

When establishing a processing program, it is necessary to establish a physical or geometrical relationship between the robot and work to be serviced by the robot. To establish physical or geometrical coordinate points precisely within the robot's working envelope using conventional teach pendant systems, an operator typically manually manipulates the robot and physically teaches coordinate points and motions by activating an appropriate pendant button or switch. Essentially, a user must manually move a robot to establish a taught position or to teach a sequence of steps, including through a desired geometric progression. With respect to cutting operations, a user manually moves a robot cutting tool through a continuous path. The continuous path may be in the form of a standard geometric shape (e.g., circle or rectangle) or may be a shape defined by CAD data.

Similarly, program verification and program touch-up learning programs typically require a user to manually lead or walk a robot through the programmed steps. During use of such a learning program, sensors record position and motion data associated with the robot. Sensors also record actual position data of the tool center point (TCP), as well as any variations or deviations from desired positions. Programming, program verification and program touch-up may be performed iteratively and may take significant time.

However, such iterative systems rely on the programmed accuracy of the learning program and on the accurate operation of the TP. In instances where the programmed motion is incorrect, or where the material being cut is affected by the cutting operation, automatic and iterative correction for positional deviation may result in an undesirable or unacceptable cutting operation, even if positional variations or deviations from the programmed motion are measured to be less than or equal to a predetermined value.

It is known to iteratively attempt to improve the continuous path of a robot. For example, an external sensor may be used to track a path of a robot and provide feedback to the robot controller for correction of the path. These external sensors, though, add cost, extra equipment, and complexity to the robot. Prior methods also adjust command parameters such as acceleration and deceleration profiles in order to correct the path of a robot. This method of adjustment is limited in flexibility and freedom because corrections can only be made along the programmed curve. Finally, prior methods also involved closed loop servo control based on monitoring and adjusting servo commands. This method, though, requires substantial data storage capability, a buffer to maintain the data and still the volume of data becomes sensitive to model and may produce a negative result.

It is therefore desirable to develop a system and method for enhancing a visualization of a learning path for a robotic cutting tool, wherein the system and method overcome the shortcomings of the prior art.

SUMMARY OF THE INVENTION

Concordant and consistent with the present invention, a method for enhancing a visualization of coordinate points within a robot's working envelope has surprisingly been discovered.

In one embodiment of the method, a user runs a user program to cause a robot to move along a first continuous programmed path to generate a first trace representative of an actual tool center point position. A path deviation is computed between the first continuous programmed path and the first trace. The user program is adjusted by the amount of computed path deviation to create a compensated user program. The first trace representative of an actual tool center point position is stored in a memory device. The compensated user program is run to cause the robot to move along a second continuous programmed path to generate a second trace representative of an actual tool center point position. The first trace and the second trace are then displayed.

In another embodiment, a robot is moved along a first continuous programmed path with a robot controller executing a learning path control program. The robot is moved without performing an operation on a workpiece. The actual movement of the robot is recorded along the first continuous programmed path. The first continuous programmed path is iteratively adjusted to create one or more modified continuous programmed paths. The robot is moved along the one or more modified continuous programmed paths with the robot controller executing the learning path control program. The robot is moved without performing the operation on the workpiece. The actual movement of the robot along the one or more modified continuous programmed path is recorded. Traces of the recorded actual movements of the robot along the first continuous programmed path and the one or more modified continuous programmed paths are displayed. An operator is permitted to select as a desired continuous path one of the traces of the first programmed continuous path and the one or more modified continuous programmed paths. The robot is moved along the desired continuous path with the robot controller while performing the operation on the workpiece.

BRIEF DESCRIPTION OF THE DRAWINGS

The above, as well as other advantages of the present invention will become readily apparent to those skilled in the art from the following detailed description, particularly when considered in the light of the drawings described herein.

FIG. 5 is an exemplary control screen allowing a user to visually select a compensated cutting path program, according to an embodiment of the invention.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
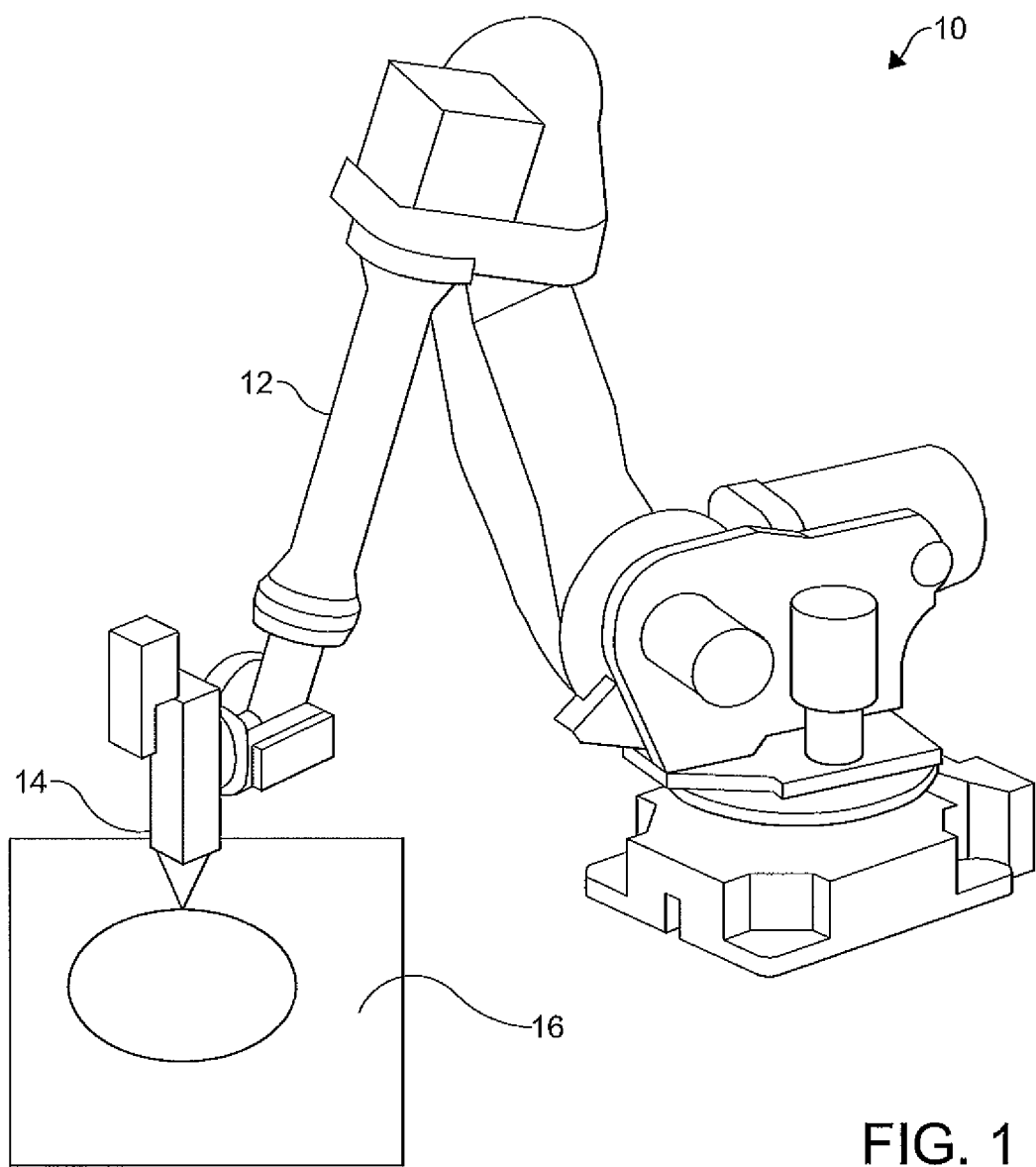
FIG. 1 is a pictorial representation of robotic system according to an embodiment of the present invention.

A robotic tool 10 including a multi-axis robotic arm 12 and a cutting tool 14 cutting an item of work 16 is described with reference to FIG. 1. As a non-limiting example, the item of work 16 may be a sheet of plastic or metal, tubular frames, or the like, or may be any other item intended to be serviced by the robotic tool 10. The robotic tool 10 may perform any action on the item of work 16. However, the present invention has particular application where the robotic tool 10 includes a cutting tool 14 performing cutting operations along a continuous path. The cutting operation may be in the form of a standard geometric shape (e.g., circle or rectangle), or may be performed in a desired shape or pattern defined by a computer program, for example, by CAD data.

Figure 2:
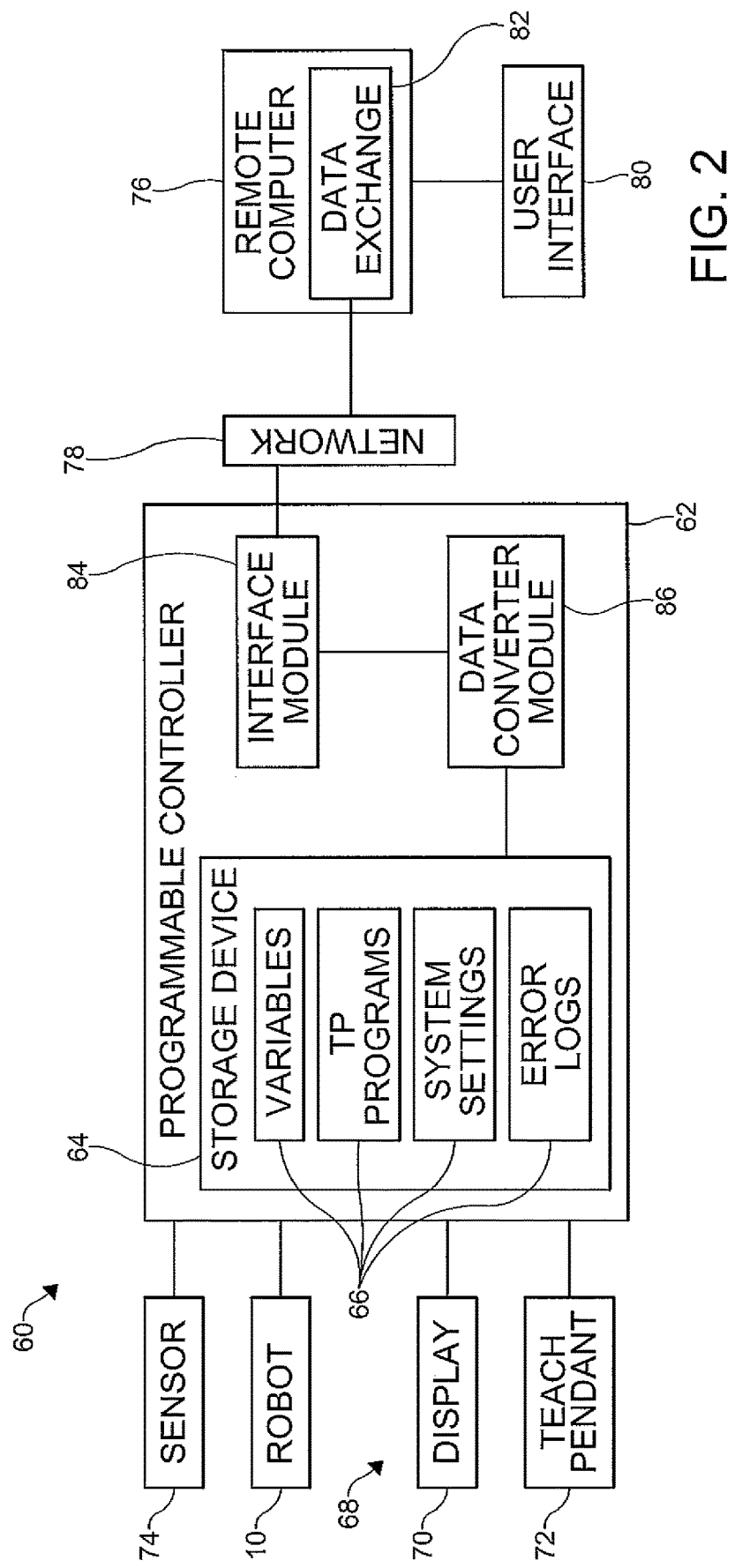
FIG. 2 is a schematic view of a robotic system incorporating the present invention.

FIG. 2 shows a system 60 incorporating the present invention. The system 60 includes at least one programmable controller 62 having a storage device 64 for storing a plurality of types of data objects 66. As used herein, a "controller" is defined as including a computer processor configured to execute software or a software program in the form of instructions stored on a memory storage device 64. The storage device 64 may be any suitable memory type or combination thereof. As also used herein, a "storage device" is defined as including a non-transitory and tangible computer-readable storage medium on which the software or the software program, as well as data sets, tables, algorithms, and other information, may be stored. The controller may be in electrical communication with the storage device for purposes of executing the software or the software program.

The types of data objects 66 include, but are not limited to, system variables, user program variables, user TP programs, learn programs, error logs, system settings, configuration and current states, and system variables. These types of data objects 66 are written in different formats as well as by different programming languages. For example, the format may be different for the error logs, the system variables and the user TP programs.

The programmable controller 62 may include a user interface 68 for allowing a user to enter data or programs into the controller 62 or for accessing the data stored therein. The user interface 68 may include a display 70 for displaying the information to the user and a teach pendant 72. In one embodiment, the display 70 is configured as part of the teach pendant 72.

The programmable controller 62 may be a robot controller, wherein in such a case, the controller 62 is coupled to the robotic tool 10 for actively performing a variety of tasks. It is understood that the present invention is not limited to robot controllers. As a non-limiting example, the programmable controller 62 may be a passive controller, such as a monitoring device that monitors predetermined conditions. Sensors 74 monitor positional deviation and/or variation of the robotic tool 10, for example, trajectory error, path deviation, and the like. The sensors 74 may record encoder feedback data to determine a TCP position.

To assist in monitoring operation of the programmable controller 62, at least one remote computer 76 is coupled to the programmable controller 62 preferably via a functional network 78. The remote computer 76 may be located in the same room or building as the programmable controller 62, or it may be located in an entirely different building, which may or may not be located in the same geographic vicinity as the controller 62. The network 78 may be a local or wide area network of controllers or may be a direct link between devices.

One or more second user interfaces 80 is coupled to the remote computer 76. The one or more second user interface 80 may include a remote computer device such as a simulation computer for entering information regarding the desired data to be accessed. The remote computer 76 also includes a data exchange facilitator 82, in communication with the user interface 80 and the network 78, for facilitating data interchange with the programmable controller 62.

Figure 3:
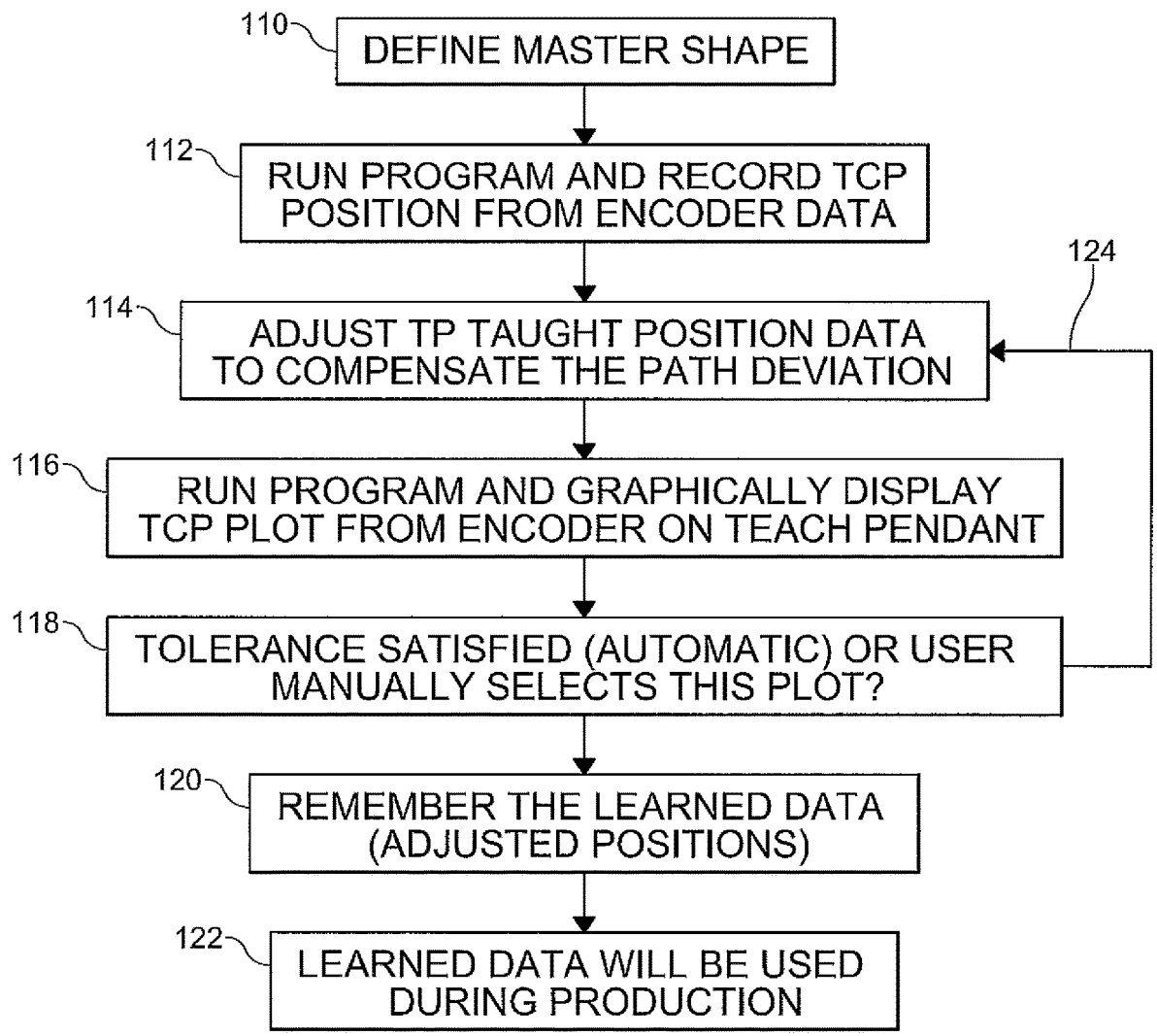
FIG. 3 is a schematic flow diagram of a method for learning path control, according to an embodiment of the invention.
Figure 4:
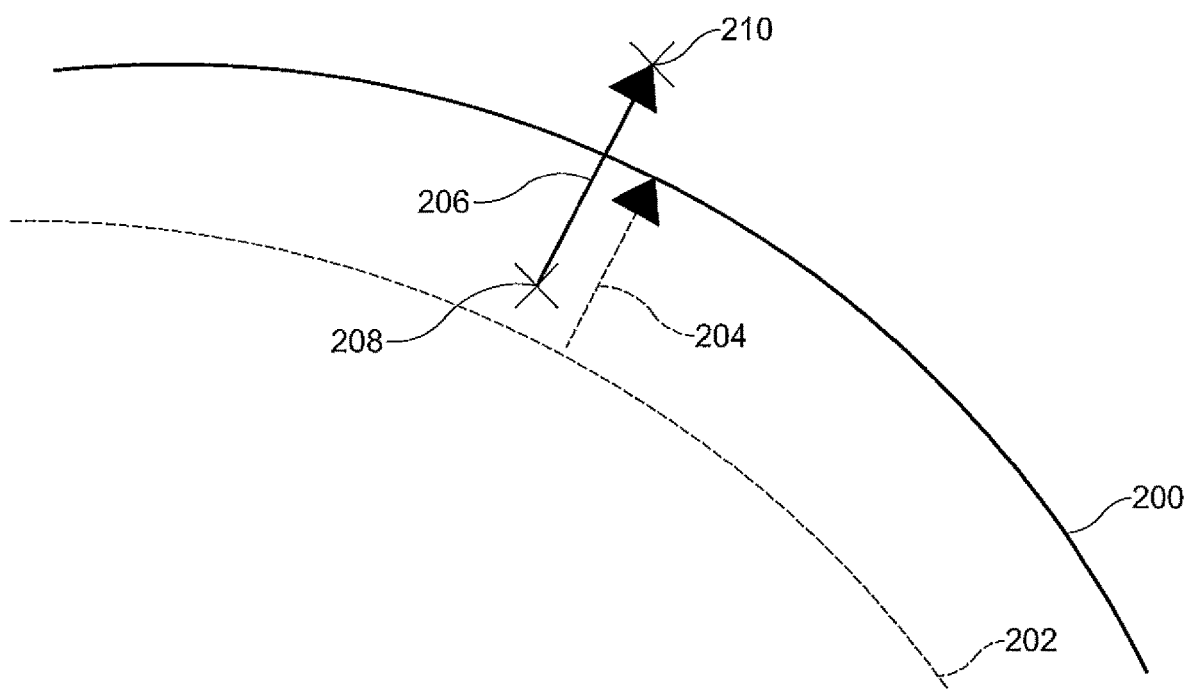
FIG. 4 is a graphical representation of an iterative learning path program for an exemplary cutting operation, according to an embodiment of the invention.

Prior to full operation of the robotic tool 10, the programmable controller 62 must be properly programmed by a user to operate based on a desired procedural framework. One method of properly programming operation of the robotic tool 10 requires a user, using the teach pendant, to "teach" an operation on the item of work 16 to the programmable controller 62 such that the robotic tool 10 can perform the desired operation. An exemplary process learning process is shown with reference to FIGS. 3 and 4. According to the learning process, a master shape to be cut by the robotic tool 10 is first defined by the user at step 110. The master shape defined in step 110 can be in the form of a standard geometric shape, for example a circle or a rectangle, achieved by moving the cutting tool 14 along a continuous path. Alternatively, a master shape may be defined by CAD data. The robotic tool 10, including the cutting tool 14, is moved along the desired path 200 (FIG. 4) to achieve the cut master shape in step 112. In particular, the programmable controller 62 executes a program to move the robotic tool 10 along the desired continuous path 200 to achieve the cut master shape. However, in step 112, the robotic tool 10 does not perform any operation upon an item of work 16. Instead, during step 112, an actual TCP path 202 of the cutting tool 14 is recorded from encoder data.

In step 114, the desired continuous path 200 and the actual TCP path 202 are compared, and path deviations are identified. In one embodiment, path deviations are calculated by determining a maximum value among the shortest distances from defined path data to neighborhood TCP positions for any motion line. As another example, for any given point along the actual TCP path 202, an offset vector 204 may be calculated that identifies the amount of offset between the actual TCP path 202 and the desired continuous path 200. The deviations and variations identified in step 114 may be used to compensate the desired path program being executed by the programmable controller 62 to create a compensated program. The desired path program may also be automatically or manually adjusted to effect changes to the process speed, tolerance, orientation, or the like. Each of these adjustments may have an effect on the actual TCP position achieved by the compensated program. The compensated program is then run by the programmable controller 62 at step 116. As before, the robotic tool 10 does not perform any operation upon an item of work 16 when the compensated program is being executed in step 116. Instead, the compensated program is run, and a second actual TCP path is recorded from encoder data. The actual TCP path is plotted and displayed to the user, either on the teach pendant 72 or on the display 70, or both. Additionally, a path compensation vector 206 may be identified that accounts for differences between a TCP position 208 from step 112 and a compensated TCP position 210 along the compensated desired path 200.

In step 118, the user reviews the actual TCP path. The user's review may be a combination of a visual review on the teach pendant 72 or on the display 70 and a comparison of variations and deviations with a pre-determined tolerance. If the user determines visually that the tolerance is satisfied, either based upon the display or otherwise, the learned data associated with the compensated program is recorded at step 120. The learned data will then be utilized during production, at step 122.

However, if the actual TCP path is not satisfactory to the user, additional learning iterations 124 may occur. In particular, the compensated program will again be adjusted to create a modified compensated program that allows the cutting tool 14 to more closely follow the desired path 200. In particular, step 114 will be repeated to adjust the TP taught position data to compensate for the path deviation. Step 116 will be repeated to run the modified compensated program and to graphically display the TCP plot on the teach pendant or another display from encoder data, and step 118 will be repeated to review the plot and allow the user to accept or reject the modified compensated program. Further iterations will occur until tolerance is satisfied or until the user manually selects a plot.

For example, as illustrated in FIG. 5, a user may perform several iterations 300 of a cutting operation. The TP or another display may show plots or traces 302 of an actual movement of the TCP as commanded by an iterative compensated program. In particular, each plot or trace 302 may include a graphical representation of the actual TCP movement 304. Additionally, an overlay trace 306 may display a desired TCP path for comparison against the actual TCP path 304. It is understood that for each iteration, plots or traces of prior iterations may be available to the user for review and selection. Accordingly, the TP or the programmable controller stores data associated with each iteration, including trace information, until the user selects a trace representative of a particular iteration to become the production-level program at step 120. In this way, the user may choose from some or all of the traces created during previous iterations of the TP learn program without having to re-execute any of the previous iterations of the TP learn program.

Importantly, the present invention does not rely on simply reducing deviations below a predetermined mathematical tolerance level. Instead, the user is provided with an opportunity to visually review each of the programmed paths in comparison to a desired path. The user is further enabled to select any of the traces created by any of the iterative compensated programs based on both subjective and objective criteria, including based simply on appearance. The ability to utilize subjective measures, including visual selection of an iterative compensated program, is particularly relevant to cutting operations, because an appearance of a continuous path cut may be more important than a mathematical deviation in some applications. Moreover, visual inspection and subjective criteria may allow a user to compensate for improperly or incorrectly programmed cutting operation without requiring time consuming reprogramming or without requiring a significant number of iterations. Finally, some materials subject to cutting operations may be affected by the cutting operation itself, causing movement of the material, shrinking, stretching, and the like, that have an effect on the cutting operation aside from the programmed accuracy. The present invention advantageously allows the user to both adjust programmed accuracy of the learning program to adjust factors such as process speed, orientation, or the like and further allows the user to visually review and inspect an effect of any adjustment on the cutting operation and any resulting alterations to the appearance of a cut. As a result, the cutting operation may be optimized for appearance as well as for speed, accuracy, and repeatability.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for controlling a robot by an operator, comprising:
   running a user program to cause the robot to move along a first continuous programmed path to generate a first trace representative of an actual tool center point position;
   computing a path deviation between the first continuous programmed path and the first trace;
   adjusting the user program by the amount of computed path deviation to create a compensated user program;
   storing the first trace representative of an actual tool center point position in a memory device;
   running the compensated user program to cause the robot to move along a second continuous programmed path to generate a second trace representative of an actual tool center point position; and
   displaying the first trace and the second trace;
   wherein the operator selects a desired continuous path from one of the first trace and the second trace.

2. The method of claim 1, wherein the operator selects the desired continuous path from a plurality of traces including the first trace and the second trace.

3. The method of claim 1, further comprising the step of:
   allowing the operator to cause the steps of
      adjusting the user program by the amount of computed path deviation to create a compensated user program; and
      running the compensated user program to cause the robot to move along a second continuous programmed path to generate a second trace representative of an actual tool center point position to repeat until the operator selects the desired continuous path.

4. The method of claim 1, wherein the first continuous programmed path is a standard geometric shape.

5. The method of claim 1, wherein the first continuous programmed path is defined by CAD data.

6. The method of claim 1, wherein at least one of the first trace and the second trace further includes a display of the desired continuous path.

7. The method of claim 1, wherein the user program adjusting step automatically adjusts one of process speed, tolerance, and orientation.

8. The method of claim 1, wherein the operator selects the desired continuous path from one of the first trace and the second trace based on an appearance of one of the first trace and the second trace.

9. The method of claim 1, wherein the user program includes a cutting operation.

10. The method of claim 9, wherein the cutting operation is configured to cut a material that is affected by the cutting operation, the cutting operation causing one of movement of the material, shrinking of the material, and stretching of the material.

11. A method for controlling a robot by an operator comprising the steps of:

moving a robot along a first continuous programmed path with a robot controller executing a learning path control program, the robot moved without performing an operation on a workpiece;

recording the actual movement of the robot along the first continuous programmed path;

iteratively adjusting the first continuous programmed path to create one or more modified continuous programmed paths;

moving the robot along the one or more modified continuous programmed paths with the robot controller executing the learning path control program, the robot moved without performing the operation on the workpiece;

recording the actual movement of the robot along the one or more modified continuous programmed paths;

displaying traces of the recorded actual movements of the robot along the first continuous programmed path and the one or more modified continuous programmed paths;

permitting the operator to select as a desired continuous path one of the traces of the first programmed continuous path and the one or more modified continuous programmed paths; and moving the robot along the desired continuous path with the robot controller, the robot moved while performing the operation on the workpiece.

12. The method of claim 11, wherein the first continuous programmed path is a standard geometric shape.

13. The method of claim 11, wherein the first continuous programmed path is defined by CAD data.

14. The method of claim 11, wherein at least one of the displayed traces further includes a display of the desired continuous path.

15. The method of claim 11, wherein the user program adjusting step automatically adjusts one of process speed, tolerance, and orientation.

16. The method of claim 11, wherein the operator selects as the desired continuous path from one of the traces of the first programmed continuous path and the one or more modified continuous programmed paths based on an appearance thereof.

17. The method of claim 11, wherein the operation on the workpiece includes a cutting operation.

18. The method of claim 17, wherein the cutting operation is configured to cut a material of the workpiece that is affected by the cutting operation, the cutting operation causing one of movement of the material, shrinking of the material, and stretching of the material.

* * * * *